Patented Sept. 1, 1953

2,650,912

UNITED STATES PATENT OFFICE 2,650,912

HEAT-TREATMENT OF COAGULATED THERMOPLASTIC POLYMER LATICES

Henry Malcolm Hutchinson, Banstead, England, assignor to The Distillers Company Limited, Edinburgh, Scotland, a British company No Drawing. Application April 18, 1950, Serial No. 156,710. In Great Britain April 23, 1949

8 Claims. (Cl. 260—93.5)

The present invention relates to the drying of coagulates produced from thermo-plastic polymers (including copolymers) which have been prepared in aqueous emulsion (herein termed emulsion polymers) and has as object the provision of a process for treating such aqueous coagulates whereby they may subsequently be centrifuged, if desired, to give a cake of sufficiently low water content to enable it to be fed directly to a hot roll mill without further drying.

It has been common practice in the past to coagulate thermo-plastic emulsion polymers, for example, by the addition of acid, and then centrifuge the resulting water-precipitate mixture to remove as much as possible of the water phase. However, it is generally not possible to reduce the water content of the centrifuge cake below about 60% by weight, even by prolonged centrifuging with equipment which can be considered suitable for large scale operation.

It has now been found that, by heating the aqueous coagulated emulsion under pressure to a temperature above its normal boiling point and about 5–25° C. above the softening point of the polymer for a few minutes, the efficiency of the subsequent centrifuging step is increased to such an extent that the water content of the filter cake may readily be reduced to a figure in the neighbourhood of 30%, this water content being sufficiently low to enable the cake to be fed directly to a hot roll mill without further drying.

It has further been found that, by prolonging the heating treatment described in the foregoing paragraph for up to 5 hours, conveniently about 1 hour, the colour and heat stability of the polymer are frequently improved, an effect which may, in part, arise from the consequent decomposition of residual catalyst.

The following examples illustrate two embodiments of this invention as applied to polystyrene.

Example 1

An emulsion of polystyrene, which had been prepared by polymerization of the monomer in aqueous emulsion in the presence of an isopropyl benzene hydroperoxide catalyst and an emulsifying agent was steam distilled to remove the residual 1% of monomer, coagulated by the addition of hydrochloric acid and the resulting aqueous coagulate was heated under 6.5 lbs. per square inch pressure to 110° C. for 5 minutes. The resulting mixture was then centrifuged and the polymer cake thus formed was found to have a water content of 30% by weight. In this example, the polystyrene has a softening point of 95° C.

By comparison, a similar polystyrene latex was steam distilled and coagulated with hydrochloric acid in the same way and then fed directly to the centrifuge. It was not found possible to produce a centrifuge cake containing less than about 60% of water from the coagulate, even by unduly prolonged centrifuging.

Example 2

An emulsion of polystyrene similar to that described in Example 1 was coagulated as described and then heated under pressure at 103–110° C. for 1 hour. The resulting mixture was then centrifuged, and the polymer cake formed had a water content slightly under 30% by weight.

The process of this invention finds particular application in the treatment of emulsion polymers (including interpolymers) of styrene compounds, namely styrene and its various polymerisable nuclear chlorine and methyl substitution derivatives such as para-methyl styrene, para-chlorstyrene and vinyl metaxylene. If desired, other methods of concentrating the polymer, for example, pressure filtering, may be employed in place of centrifuging, but the latter is preferred.

The softening point referred to herein is that determined in accordance with British standard specification No. 1,493/48.

I claim:

1. A process which comprises heating an aqueous slurry of a thermoplastic emulsion polymer of a compound selected from the group consisting of styrene and its polymerisable nuclear methyl and chlorine substitution derivatives under pressure at a temperature of about 100–120° C. for about 5 minutes to about one hour.

2. A process as set forth in claim 1, wherein said period of time is about 1 hour.

3. A process as set forth in claim 1, wherein liquid is further removed from the aqueous slurry, after heating.

4. A process in accordance with claim 1 in which the polymer is steam distilled prior to heating it under superatmospheric pressure.

5. A process as set forth in claim 1 wherein the aqueous slurry, after heating, is centrifuged to give a polymer cake having a water content of about 30% by weight.

6. A process as set forth in claim 5 wherein the polymer cake is fed to a hot roller mill without further drying.

7. A process which comprises heating an aqueous slurry of a thermoplastic emulsion polymer of a compound selected from the group consisting of styrene and its polymerisable nuclear methyl and chlorine substitution derivatives at a temperature above the normal boiling point of said slurry under a superatmospheric pressure of about 6.5 pounds per square inch.

8. A process which comprises coagulating an emulsion obtained by the emulsion polymerisation of styrene, and heating the resulting aqueous slurry under pressure at a temperature of 103–110° C. for about 5 minutes to about 1 hour.

HENRY MALCOLM HUTCHINSON.

References Cited in the file of this patent

UNITED STATES PATENTS

| Number | Name | Date |
|---|---|---|
| 2,458,636 | Plambeck | Jan. 11, 1949 |

OTHER REFERENCES

Wente, App. Ser. No. 781,418, Abstract 656 O. G. 890, Mar. 18, 1952.